(12) United States Patent
Trapp

(10) Patent No.: US 9,374,700 B2
(45) Date of Patent: Jun. 21, 2016

(54) GLOBAL LOCAL SIM

(71) Applicant: Tyntec Limited, Douglas (GB)

(72) Inventor: Thorsten Trapp, Hagen (DE)

(73) Assignee: Tyntec Limited, Douglas (GB)

( * ) Notice: Subject to any disclaimer, the term of this patent is extended or adjusted under 35 U.S.C. 154(b) by 567 days.

(21) Appl. No.: 13/827,085

(22) Filed: Mar. 14, 2013

(65) Prior Publication Data

US 2014/0274034 A1     Sep. 18, 2014

(51) Int. Cl.
*H04W 8/06* (2009.01)
*H04W 8/18* (2009.01)
*H04W 8/12* (2009.01)

(52) U.S. Cl.
CPC . *H04W 8/06* (2013.01); *H04W 8/12* (2013.01); *H04W 8/183* (2013.01)

(58) Field of Classification Search
CPC .......... H04W 8/06; H04W 8/12; H04W 8/183
USPC ...................................... 455/432.1
See application file for complete search history.

(56) References Cited

U.S. PATENT DOCUMENTS

| 8,185,156 | B2* | 5/2012 | Camilleri | H04W 8/183 455/428 |
| 2005/0192035 | A1* | 9/2005 | Jiang | H04W 8/26 455/461 |
| 2007/0203880 | A1* | 8/2007 | Kumar | H04L 12/14 |
| 2010/0188975 | A1* | 7/2010 | Raleigh | G06Q 10/06375 370/230.1 |
| 2010/0330957 | A1* | 12/2010 | Harada | H04M 15/00 455/406 |
| 2012/0275442 | A1* | 11/2012 | Malets | H04W 4/16 370/338 |
| 2012/0282924 | A1* | 11/2012 | Tagg | H04W 8/18 455/432.1 |
| 2015/0011183 | A1* | 1/2015 | Sawai | H04M 15/851 455/408 |

FOREIGN PATENT DOCUMENTS

DE           10121705 A1      11/2002

* cited by examiner

*Primary Examiner* — Qun Shen
(74) *Attorney, Agent, or Firm* — Mendelsohn Dunleavy, P.C.; Steve Mendelsohn

(57) ABSTRACT

A communication system includes a telephone network having a mobile communication switching center, a plurality of subscriber terminals, and routing logic. The system further including a plurality of wireless access points located in different countries, wherein each of the subscriber terminals is identified by a telephone number, the telephone numbers being selected from a block of telephone numbers in international format, but which have not been allocated to any particular country, the wireless access points being configured to pass all signals from any of the subscribers' terminals having telephone numbers within the number block to the mobile communication switching center which contains MNO core infrastructure. A method is also provided. The system and method create a network in which SIM-enabled mobile phone can be used worldwide as if on a local network, and without roaming charges.

9 Claims, 1 Drawing Sheet

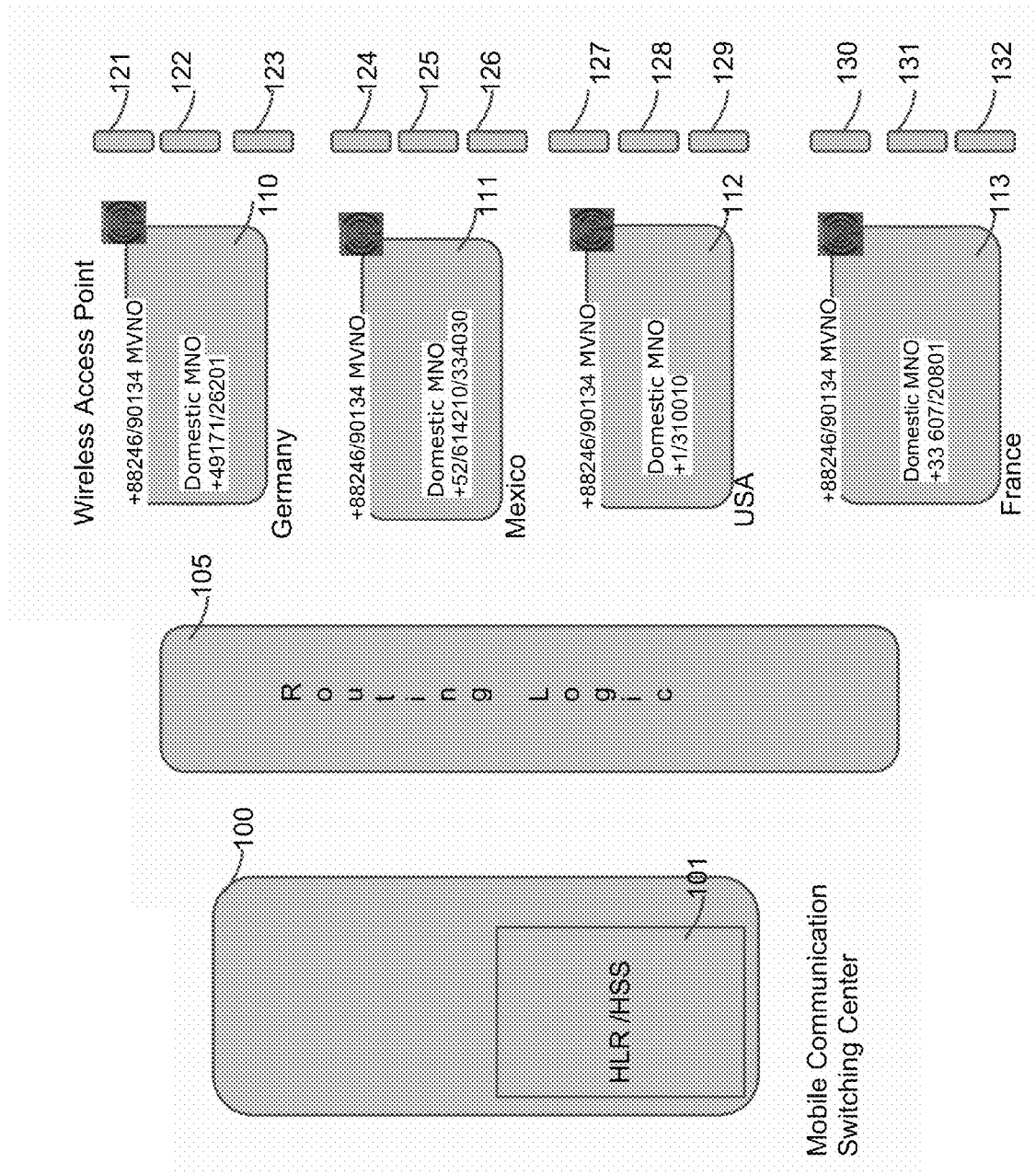

GLOBAL LOCAL SIM

TECHNICAL FIELD

The present invention relates to communication systems and methods, particularly mobile telephone systems, which may also be capable of voice, video, SMS (short message service), and data transfer.

BACKGROUND

Under current commercial models, a mobile network operator or MNO (also known as a wireless service provider, wireless carrier, cellular company, or mobile network carrier) is a provider of wireless communications services that owns or controls all the elements necessary to sell and deliver services to an end user including radio spectrum allocation, wireless network infrastructure, back haul infrastructure, billing, customer care and provisioning computer systems, and marketing, customer care, provisioning, and repair organizations.

A key-defining characteristic of a mobile network operator is that an MNO must own or control access to a radio spectrum license from a regulatory or government entity. A second key defining characteristic of an MNO is that an MNO must own or control the elements of the network infrastructure that are necessary to provide services to subscribers over the licensed spectrum.

A mobile network operator typically also has the necessary provisioning, billing, and customer care computer systems and the marketing, customer care, and engineering organizations needed to sell, deliver, and bill for services. However, an MNO can outsource any of these systems or functions and still be considered a mobile network operator.

In addition to obtaining revenue by offering retail services under its own brand, an MNO may also sell access to network services at wholesale rates to mobile virtual network operators (MVNOs) either directly or by means of a mobile virtual network enabler (MVNE). An MVNE has a contract with an MNO to set up one or more MVNOs based on the MVNE infrastructure which is connected to the host MNO.

An MVNO (or mobile other licensed operator (MOLO) in the United Kingdom) is a wireless communications services provider that does not own the radio spectrum or wireless network infrastructure over which the MNO provides services to its customers. An MVNO enters into a business agreement with a mobile network operator to obtain bulk access to network services at wholesale rates, then sets retail prices independently. An MVNO may use its own customer service and billing support systems, marketing, and sales personnel, or it may employ the services of an MVNE.

Most MVNOs are dependent on some elements of their host MNO, which makes changing host MNO difficult or even impossible.

An MVNO providing a full service runs its own infrastructure. It runs its own domestic interconnects and has a single MNO agreement to bring the wireless connection to its SIM (subscriber identity module) card equipped subscriber handsets. Those MVNO SIM cards are usually IMSIs (MCC/MNC (mobile country code/mobile network code)) from the host MNO to allow roaming into other networks/countries.

This current arrangement suffers from the disadvantage that when a subscriber calls from another country, the cost of the call is considerably higher than if they were to make the same call within the same country. The reason for the higher cost of a call initiated outside the user's home area is that it falls under a "roaming agreement". Roaming is where a call is processed by the mobile network to which the caller does not belong, for a fee, which is passed back to the customer via their local mobile network operator. The high cost of "roaming" charges can be alleviated if a user possesses more than one SIM card. When the user moves to another country, they simply remove their old SIM card from their mobile telephone and replace it with one appropriate to the new country. This involves a change of phone number as soon as the SIM card is replaced. Another technique involves use of mobile telephones with more than one position for a SIM card. The telephone detects automatically by monitoring base station signals which country it is in, and switches to the appropriate SIM card. Also known are systems in which a single SIM card is programmed with data from several different mobile network operators, one per country. Again, the telephone detects which network operator is appropriate and switches to the appropriate data. These multiple SIM card or multiple data arrangements also suffer from the disadvantage that the identity of the mobile phone user changes as they cross national boundaries. Thus, a caller A can place a call to caller B while caller B is in a first country. If caller B then crosses the border and returns the call to caller A, the call appears to be coming from a different identity, whereas, in fact, it is the same person returning the call.

SUMMARY

In certain embodiments of the present invention, a method and/or system enables communication between subscribers, particularly mobile telephone communication, in which the increase in cost when a user changes country is eliminated, and also the user maintains the same identity irrespective of the country in which they happen to be.

In one embodiment, the invention provides a method of communication between subscribers of a telephone network. The telephone network may suitably comprise the usual mobile network operator infrastructure including a home location register, which keep track of subscribers' mobile terminals and includes data relevant thereto. This infrastructure is referred to in the discussion that follows as the mobile communication switching center. The method according to this embodiment of the invention includes providing a block of telephone numbers in international format and assigning individual numbers in the block to subscribers of the telephone network. A number is considered to be in international format if it is globally unique. For example, a number under ITU-T E.164 recommendation starting with a country code and identification code, followed by the subscriber's number. Each subscriber is, moreover, issued a SIM card and international mobile subscriber identity (IMSI) corresponding to the individual number which, in accordance with normal mobile network operator practice, enables that subscriber to make mobile telephone calls to and from the assigned telephone number. In the example described in more detail below, the international telephone numbers are in the range +88246, this being an example of a number in international format and which has not been assigned to a particular country. Assignment of blocks of numbers is handled by the International Telecommunications Standardization Bureau under ITU-T E.164 recommendation.

The method in accordance with this embodiment of the present invention also includes obtaining bulk wireless access at a wireless access point in each of a plurality of geographic areas. Typically, the bulk wireless access would be provided under a rental agreement with a mobile network operator in each geographical area, for example, country. Such rental agreements can be structured as any one or more of a flat rate, a rate per minute, per SMS, per subscriber, per data packet, and a data only flat rate. The rental includes typically not only the pure spectrum, but also access to the base station subsystem, etc. Ideally, the telephone network would rent wireless access from a mobile network operator (MNO) in each country and thereby act in every country as a mobile virtual network operator (MVNO). Unlike the conventional MVNO model discussed above, the MNO from which the wireless access is rented in the countries does not provide the SIM cards and/or the IMSIs. The function of the home location register and mobile switching is all performed within the IMSI/MSISDN (mobile station international subscriber directory number) range owner's telephone network and is common to all countries.

The method according to this embodiment of invention also involves feeding signals which may include signaling, voice payload, video payload, data service, or any combination thereof from the bulk wireless access points back to the mobile communication switching center. The mobile communication switching center is then responsible for setting up connections between calling and called subscribers. Typically, these signals may be fed via routing logic. The routing logic is able to route signaling packets of information as well as payload packets between the wireless access points and the mobile communication switching center.

The step of obtaining bulk access may include the conclusion of MVNO agreements in at least one country wherein the agreement specifies that all data relevant to an MNO's core infrastructure and received from a subscriber's terminal with a MSISDN and/or IMSI indicating that the subscriber has been assigned a telephone number within the said block, must be forwarded to the MVNO. The conclusion of such agreement in several countries would establish the "Global local SIM" concept.

According to a second embodiment, the invention also provides a communication system including a telephone network having a mobile communication switching center, a plurality of subscriber terminals, and routing logic. The system further includes a plurality of wireless access points located in different countries, wherein each of the subscriber terminals is identified by a telephone number. The telephone numbers are selected from a block of telephone numbers in international format, but which have not been allocated to any particular country. The wireless access points are configured to pass signals from any subscribers' terminals having telephone numbers within the block on to the mobile communication switching center.

At least one of the wireless access points may be part of the infrastructure of a respective second telephone network having a second plurality of subscribers. The second telephone network has (i) its own home location register for maintaining location data of mobile terminals of the second plurality of subscribers and (ii) a second mobile communication switching center for routing communications originating from the second plurality of subscribers.

Each of the mobile terminals may contain a SIM card/IMSI identifying the mobile terminal as having an identity within the said block of telephone numbers. The mobile communication switching center may have a home location register giving location information for each of the subscribers. The communication may be selected from the group consisting of voice, SMS, video, and data.

BRIEF DESCRIPTION OF THE DRAWINGS

The invention will now be illustrated by means of the description of an example making reference to the accompanying drawing, in which:

FIG. 1 is a schematic diagram of a telephone network with a mobile communication switching center wireless access point and subscribers.

DETAILED DESCRIPTION

Reference is now made to FIG. 1 which shows a communications system according to one embodiment of the present invention. It has a mobile communication switching center 100, which comprises the usual mobile network operator's core infrastructure including a home location register 101. The home location register includes an entry for each subscriber on the system, giving details of the whereabouts of the subscriber's terminal and other information such as billing details. The operation of mobile network operator's core infrastructure including the home location register is well known.

Each subscriber to the system has a mobile terminal 121 to 132 of which 12 are shown in FIG. 1. In practice, the system may include many thousands of such terminals. The terminals, in common with normal mobile telephone communication practice, identify themselves by means of an international mobile subscriber identity (IMSI), which is held on a SIM card within the terminal. The terminals may, for example, be smart phones or ordinary mobile phones. Each of the subscribers 121-132 has been assigned a telephone number in international format, drawn from a block of telephone numbers, with a prefix +88246. The prefix +88246 corresponds to an ISMI with the prefix 90134. This is a block of telephone numbers which is not assigned to any particular country. Each of the mobile terminals 121-132 contains a transceiver, which is able to communicate wirelessly with base stations belonging to the cellular telephone network of the geographic area in which the subscriber is at any one time.

In FIG. 1, the subscriber terminals 121 to 123 are in Germany and are able to communicate with a wireless access point 110. Wireless access point 110 is part of the infrastructure of a local German domestic mobile network operator from which the telephone network to which subscribers 121 to 123 belong rents wireless access. This German mobile network operator also has its own subscribers which have telephone numbers with the prefix +49171, this being the country code for Germany, with the provider t-mobile. The corresponding IMSI prefix is 26201. Thus the same wireless access point communicates with (i) its own mobile terminals having a prefix +49171 and (ii) the terminals 121-123 with the prefix +88246.

The communication system also includes mobile terminals 124-126 which are in Mexico and communicate with a wireless access point 111 belonging to a Mexican MNO. The Mexican access point services the terminals 124-126 with the prefix +88246, and at the same time its own subscriber's terminals with the prefix +52, this being the country code for Mexico. The full prefix and IMSI for a Mexican provider are shown in FIG. 1 in box 111. Similarly, terminals 127-129 are in the USA and communicate with the wireless access point 112 operated by a United State MNO. The USA MNO communicates with its own subscribers with the prefix +1, this being the country code for North America and with the terminals 127-129 under the prefix +88246. The full prefix and IMSI for a USA provider are shown in FIG. 1 in box 112. The analogous situation applies to the subscriber terminals 130-132 and wireless access point 113 in France.

Under the terms of the rental agreement, the operator of a wireless access point is required to pass all signals indicating as originating from the block owned by the said telephone network (prefix +88246) immediately to the routing logic 105, for example, using its Global Title. The routing logic passes the signaling on to the mobile communication switching center 100, where it is handled in a manner conventional for mobile network operations. For example, if the signaling is a location update for mobile terminal 122 destined for the home location register (HLR) 101, the update is affected. If the signaling is a query to the HLR register concerning the location of one of the other subscriber terminals, the necessary information is supplied.

The mobile communication switching center 100 responds to the subscriber terminals 121 to 132 via the routing logic 105, which directs the response to the appropriate wireless access point 110 to 113 for transmission to the terminal.

If the subscriber terminal 128 in the USA places a call, the call is received by the MNO's wireless access point 112 in the USA. This wireless access point 112 recognizes the call as originating from a +88246 prefixed number and relays firstly (i) the signaling to set up the call, and then (ii) the voice or other data stream of the call itself via the routing logic 105 to the mobile communication switching center 100. This is in contrast to the behavior of the same United States MNO if it received a transmission from one of its own subscribers or a subscriber with a roaming agreement. In that case, the MNO would use its own core infrastructure to handle the transmission. This illustrates the different behavior of the same MNO equipment/wireless access point depending on whether it is servicing mobile terminals 121-132 or servicing its own terminals.

In one embodiment, the invention is a method for providing communications for mobile virtual network operator (MVNO) subscribers. Telephone numbers in a block of telephone numbers in international format are assigned to the MVNO subscribers, where each MVNO subscriber has a corresponding SIM card and a corresponding international mobile subscriber identity (IMSI) Arrangements are made for a plurality of mobile network operators (MNOs) in a plurality of geographical areas to provide each MVNO subscriber with local access to each MNO. In particular, when an MVNO subscriber is in a first geographical area, a first MNO in the first geographical area provides the MVNO subscriber with local access to the first MNO based on the corresponding SIM card and the corresponding IMSI of the MVNO subscriber. Similarly, when the MVNO subscriber is in a second geographical area, different from the first geographical area, a second MNO in the second geographical area provides the MVNO subscriber with local access to the second MNO based on the corresponding SIM card and the corresponding IMSI of the MVNO subscriber. In this scenario, the second MNO provides subscribers of the first MNO with roaming access, but not local access to the second MNO, and the first MNO provides subscribers of the second MNO with roaming access, but not local access to the first MNO.

Pursuant to the previously established arrangement, when the MVNO subscriber places a call in the first geographical area (e.g., Germany), the first MNO (e.g., 110) routes the call to mobile communication switching center (MCSC) 100 of the MVNO. Similarly, when the MVNO subscriber places a call in the second geographical area (e.g., Mexico), the second MNO (e.g., 111) routes the call to the MCSC 100 of the MVNO.

The MNOs provides each MVNO subscriber with local access for both (i) incoming calls to the MVNO subscriber and (ii) outgoing calls from the MVNO subscriber. In one implementation, each MVNO subscriber has only one corresponding SIM card and only one corresponding IMSI.

The rental of the wireless access points in each country is part of the running cost of the telephone network and is not specifically charged on a call-by-call basis to the subscribers according to their location. Thus, every subscriber, irrespective of the country where the subscriber happens to be, is effectively on the same local network. No roaming charges are incurred, because the country's mobile network operator is acting only as a domestic wireless access point. The subscriber can use the same SIM card in every country and can enjoy domestic-priced services and reachability in every country. Thus, the telephone network can be considered a multi-domestic setup, as compared with the prior technology in which a subscriber has a single home network and relies on the existence of roaming arrangements when the subscriber is not in his or her home network. Accordingly, roaming costs never apply. Another advantage which accrues from arrangements in accordance with certain embodiments of the invention is that the MNO partner that is providing the wireless access in the countries can be changed without technical complication. This is because all of the SIMs/IMSIs in whichever country they are being used are owned by the telephone network (90134 in the example of FIG. 1) and the telephone network also provides the vital parts of the MNO infrastructure. Users communicating with subscribers of the telephone network can always be assured that a call will be returned from the same number, irrespective of where the call to the subscriber happens to be at the time.

The provider of the numbers, or block of numbers, would then be an Mobile Virtual Network Enabler. Therefore, a further advantage of certain embodiments of the present invention is that SIM cards could be distributed globally by a variety of individuals. The ability to sell or give SIM cards that are in effect never roaming, has a number of use cases ranging from fixed-line carriers, loyalty programs, different business models, and Over The Top (OTT) telecommunications and internet service providers.

In summary therefore, one or more of the following exemplary benefits can be seen:
   Using an IMSI and MSISDN range which is not from a specific country to generate a multi-country MVNO and replacing roaming with a multi-domestic setup, eliminating the need for multiple SIM profiles on one SIM and eliminating the roaming scenario.
   Through owning SIM, MSISDN, and infrastructure, the role of a host MNO is down to allowing access for the Mobile station and SIM card through its spectrum and base station network. The host MNO can be changed any time without the need of changing SIM, MSISDN, or core network elements, thus creating the possibility to commoditize mobile access.

Having thus described embodiments of the invention it should be apparent that various modifications and changes can be made without departing from the spirit and scope of the present invention.

The invention claimed is:

1. A method of providing communication between subscribers of a telephone network having a mobile communication switching center, the method comprising:
   (a) providing a block of telephone numbers in international format;
   (b) assigning only one telephone number out of the block to each subscriber, and issuing only one corresponding subscriber identity module (SIM) card, only one corresponding international mobile subscriber identity IMSI and only one corresponding mobile station international subscriber directory number (MSISDN) to each subscriber enabling each subscriber to receive and make mobile telephone calls to and from the only one assigned telephone number in any and all of a plurality of geographical areas;

(c) obtaining bulk wireless access at a wireless access point in each of the plurality of geographical areas for ones of the said subscribers in that area; and (d) feeding signals from any of said bulk wireless access points to the mobile communication switching center to communicate with one of said subscribers via a respective wireless access point, wherein the step of obtaining bulk access includes conclusion of a mobile virtual network operator (MVNO) agreement in at least one country wherein the agreement specifies that all data relevant to a mobile network operator (MNO)'s core infrastructure and received from a subscriber's terminal with an MSISDN and an IMSI indicating that the subscriber has been assigned a telephone number within the said block, must be forwarded to the MVNO.

2. The method according to claim 1, wherein the step of feeding signals from said bulk wireless access point comprises transmitting signaling to query a home location register located in the mobile communication switching center.

3. The method according to claim 1, wherein the step of feeding signals from the bulk access point includes passing location information from a subscriber in radio contact with one of the wireless access points to the mobile communication switching center for storage in the home location register.

4. The method according to claim 1, wherein the signals comprise signaling, short message service (SMS), voice data stream, video data stream, data service, or any combination thereof.

5. A communication system comprising:
a telephone network having a mobile communication switching center;
a plurality of subscriber terminals;
routing logic; and
a plurality of wireless access points located in different countries, wherein each of the subscriber terminals is identified by only one telephone number, the telephone numbers being selected from a block of telephone numbers in international format, but which have not been allocated to any particular country, the wireless access points being configured to pass signals from any subscriber terminal having a telephone number within the block via the routing logic on to the mobile communication switching center, wherein each of the subscriber terminals contains only one corresponding SIM card, only one IMSI and only one MSISDN identifying the mobile terminal as having only one telephone number within the said block of telephone numbers and common to all of the different countries, wherein: at least one of the wireless access points is part of infrastructure of a second telephone network; and
said second telephone network has a second plurality of subscribers, the second telephone network comprising:
its own home location register for maintaining location data of mobile terminals of the second plurality of subscribers; and
a second mobile communication switching center for routing communications originating from the second plurality of subscribers.

6. The system according to claim 5, wherein the mobile communication switching center has a home location register giving location information for each of the subscribers.

7. The system according to claim 5, wherein the communication comprises one or more of voice, SMS, video, and data.

8. A method for providing communications for mobile virtual network operator (MVNO) subscribers, the method comprising:
(a) assigning only one telephone number out of a block of telephone numbers in international format to each of the MVNO subscribers, wherein each MVNO subscriber has only one corresponding SIM card, only one corresponding international mobile subscriber identity (IMSI), and only one corresponding mobile station international subscriber directory number (MSISDN); and
(b) arranging for a plurality of mobile network operators (MNOs) in a plurality of geographical areas to provide each MVNO subscriber with local access to each MNO, such that:
(1) when an MVNO subscriber is in a first geographical area, a first MNO in the first geographical area provides the MVNO subscriber with local access to the first MNO based on the corresponding SIM card, the corresponding IMSI, and the corresponding MSISDN of the MVNO subscriber; and
(2) when the MVNO subscriber is in a second geographical area, different from the first geographical area, a second MNO in the second geographical area provides the MVNO subscriber with local access to the second MNO based on the corresponding SIM card, the corresponding IMSI, and the corresponding MSISDN of the MVNO subscriber, wherein:
the second MNO does not provide subscribers of the first MNO with local access to the second MNO; and
the first MNO does not provide subscribers of the second MNO with local access to the first MNO,
wherein, pursuant to the arrangement of step (b): when the MVNO subscriber places a call in the first geographical area, the first MNO routes the call to a mobile communication switching center (MCSC) of the MVNO; and
when the MVNO subscriber places a call in the second geographical area, the second MNO routes the call to the MCSC of the MVNO.

9. The method of claim 8, wherein the MNOs provide each MVNO subscriber with local access for both (i) incoming calls to the MVNO subscriber and (ii) outgoing calls from the MVNO subscriber.

* * * * *